United States Patent [19]

Brown

[11] Patent Number: 5,765,610

[45] Date of Patent: Jun. 16, 1998

[54] AIRCRAFT FUELING NOZZLE HAVING IMPROVED LOCK PINS

[76] Inventor: Albert W. Brown, 1207 Pembroke, Newport Beach, Calif. 92660

[21] Appl. No.: 599,519

[22] Filed: Jan. 29, 1996

[51] Int. Cl.$^6$ ............................................. B67C 3/34
[52] U.S. Cl. .................... 141/383; 141/346; 141/392; 137/614.06; 244/135 R
[58] Field of Search ...................... 141/384, 387, 141/382, 383, 385, 386, 388, 389, 346-353, 113, 367, 378, 392; 137/614.02, 614.03, 614.04, 614.06, 553; 285/91; 244/135 A, 135 R

[56] References Cited

U.S. PATENT DOCUMENTS

| 2,679,407 | 5/1954 | Badger, Jr. | 137/614.06 |
| 4,567,924 | 2/1986 | Brown | 141/207 |

*Primary Examiner*—David J. Walczak
*Assistant Examiner*—Steven O. Douglas
*Attorney, Agent, or Firm*—Roy A. Ekstrand

[57] ABSTRACT

An aircraft fueling nozzle includes a nozzle body supporting a valve seal and valve poppet movable between an open and closed position. The nozzle body supports a trio of extending index pins together with a trio of spring-biased movable lock pins extending toward the receptacle end of the nozzle body. A nozzle collar is rotatably supported by the nozzle body and defines a trio of inwardly extending inclined ribs which receive and engage a conventional fueling adapter upon a to-be-fueled aircraft. A lock pin alignment ring is secured upon the upper edge of the nozzle body and defines apertures through which the index pins and lock pins extend. The apertures receiving the lock pins are elongated defining straight parallel sides while the apertures receiving the index pins are circular. The lock pins define a cylindrical portion received within a bore formed in the nozzle body and an upper end defining parallel flat sides and a pair of opposed shoulder portions at the intersection of the flat sides and the cylindrical portion. The upper end of the lock pins is reduced in size and offset from the pin center line to provide clearance of the lock pin within the nozzle collar.

8 Claims, 3 Drawing Sheets

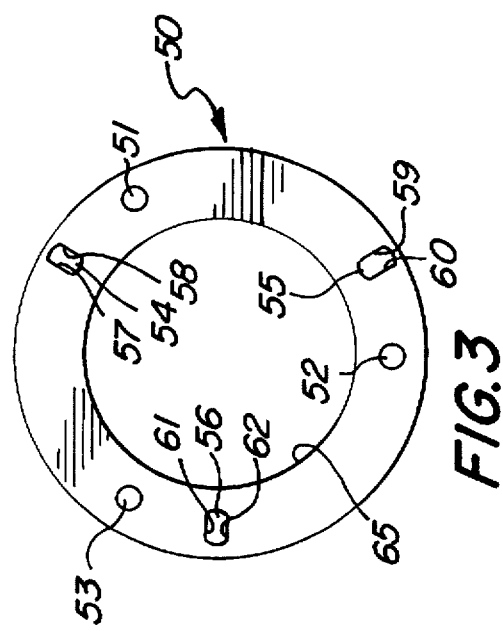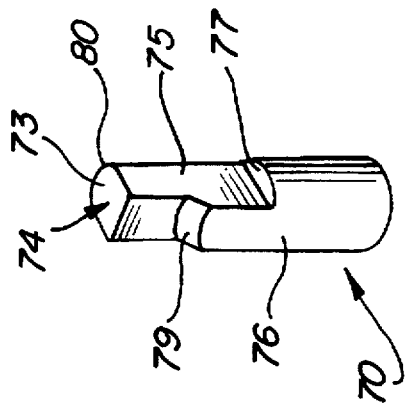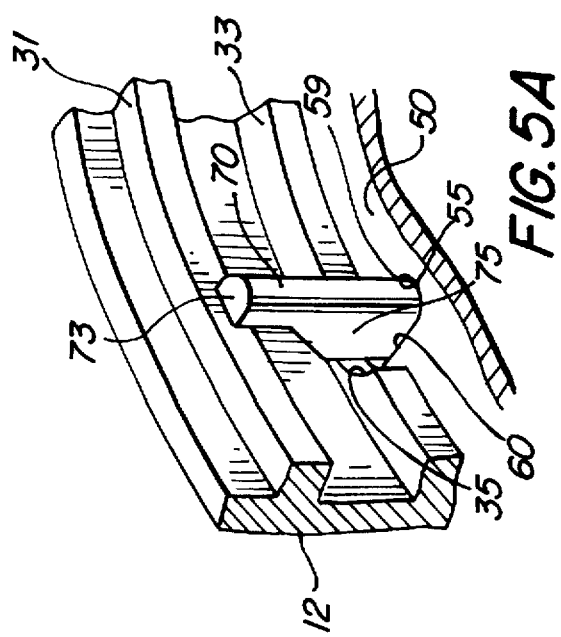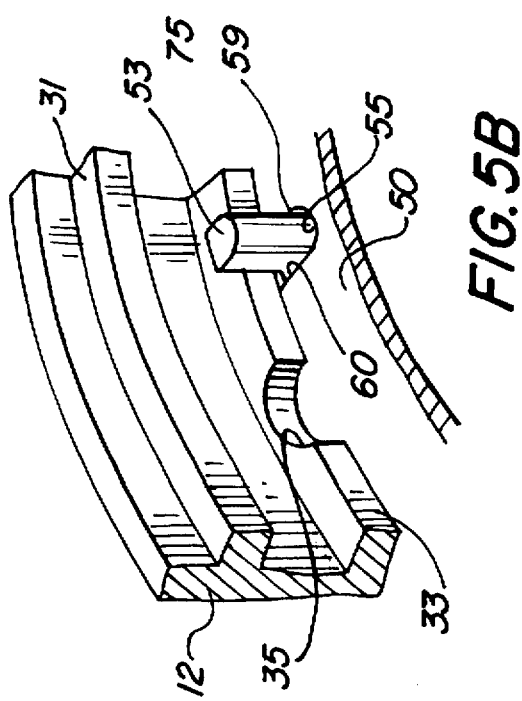

AIRCRAFT FUELING NOZZLE HAVING IMPROVED LOCK PINS

FIELD OF THE INVENTION

This invention relates generally to aircraft fueling nozzles and particularly to the safety interlock mechanisms used thereon.

BACKGROUND OF THE INVENTION

Aircraft refueling takes place in a relatively commonplace sequence of events as various aircraft, either military or civilian, are repeatedly fueled between flights by crews on the ground. The aircraft fuel system includes a fuel line which terminates in an exposed adapter at the fuel input point. The refueling facilities include a stationary or mobile fuel supply having an extended large diameter hose and various pumps for delivery of the fuel under pressure. A fueling nozzle is secured to the delivery end of the fuel hose and is mechanically configured to engage and receive the adapter supported upon the airplane fuel system.

The fuel nozzle is required to perform several basic mechanical functions which include mechanically engaging and locking to the airplane fuel system adapter, providing a high pressure fuel seal between the fuel delivery hose and the aircraft fuel system, and properly valving the fuel flow between the fuel system and the aircraft to provide open flow and closed seal conditions to facilitate fueling and the termination of fueling. In addition to these basic functions, modern fueling nozzles provide various safety mechanisms directed toward the prevention of fuel spillage and leakage. This is critical to the operation of such refueling systems due to the highly volatile and flammable character of aircraft fuels. One such safety mechanism provides an interlock within the fuel nozzle which prevents opening the flow control valve until the nozzle has completed proper mechanical and sealing engagement with the aircraft fuel system adapter.

Through the years, practitioners in the art have provided a great variety of fueling nozzles to meet this critical need. For example, U.S. Pat. No. 4,794,960 issued to Hawley, et al. sets forth a PRESSURE FUEL NOZZLE having a body connectible to a tank inlet. The body includes an axially displaceable valve movable between a closed retracted position and an extended position. A rotatable connection sleeve interacts with the valve mechanism to prevent valve opening in the absence of correct sleeve position and interlock to the aircraft fuel system.

U.S. Pat. No. 3,045,721 issued to Shepherd, et al. sets forth an UNDER-WING FUELING NOZZLE having a generally cylindrical body, a movable valve poppet and a pair of outwardly extending side handles.

U.S. Pat. No. 3,055,405 issued to Pase sets forth AUTOMATIC TANK FILLING SYSTEMS configured to provide an automatic fueling system in which the connection between the nozzle and coupling device at the tank is never under excessive pressure and in which the control system for closing the nozzle is completed simultaneously with the attachment of the nozzle to the fill pipe in the tank.

U.S. Pat. No. 3,806,565 issued to Mosher sets forth a SERVICING NOZZLE having an elongated cylindrical valve body engageable with a fuel system and having a right angle disposed delivery passage formed therein.

U.S. Pat. No. 4,419,174 issued to Warland sets forth a FILLING MEANS comprising an automatic shut off nozzle for a vehicle servicing system which may be rapidly mated to a receiver fitting on a fuel tank. The nozzle includes a piston which moves so as to displace a spring-biased operculum forming the valve of the receiver. The piston is automatically retracted when the receiver is filled.

U.S. Pat. No. 3,330,313 issued to Rosell sets forth an SUPPLY AND RECEIVER COUPLING having an elongated body securable to a fuel delivery hose and having an engagement end for mating to a to-be-fueled receiver. An elongated shaft within the nozzle body supports a movable valve poppet which in turn is coupled to a lever controlled by a safety interlock rod to preclude premature opening of the valve.

U.S. Pat. No. 2,729,471 issued to Fraser sets forth a VALVED COUPLING DEVICES FOR PIPES OR CONDUITS, while U.S. Pat. No. 2,737,401 issued to Lindsay sets forth a FUEL SERVICING NOZZLE. Additional early nozzle designs are set forth in various U.S. Patents including U.S. Pat. No. 2,680,030 issued to Hoelzer, U.S. Pat. No. 2,665,926 issued to Fraser and U.S. Pat. No. 2,665,925 also issued to Fraser.

Perhaps one of the most successful fueling nozzles is set forth in U.S. Pat. No. 4,567,924 issued to Brown and entitled AIRCRAFT UNDER-WING FUELING NOZZLE SYSTEM. As set forth therein, a modular nozzle system for refueling aircraft fuel tanks includes a nozzle valve linkage mechanism which permits the valve body to have a shorter length than previous designs. The nozzle may include a mechanical fuse for releasing the connection between the nozzle body and a fuel tank upon application of predetermined forces. The nozzle may also include a swivel joint which facilitates positioning the nozzle for connection to a fuel tank. In addition, the nozzle may also include a quick disconnect assembly which facilitates connection of the nozzle to various hose end connections. The apparatus includes a rotating sleeve rotatably mounted upon the nozzle body which receives and locks to the aircraft fueling adapter to provide engagement. An interlock prevents the opening of the flow control valve poppet within the nozzle body until proper mechanical engagement as evidenced by the rotational position of the sleeve is obtained. A receiving portion within the nozzle body receives and engages the aircraft fueling adapter and includes a plurality of spring supported depressible lock pins. The lock pins prevent the rotation of the sleeve in the absence of the insertion of the aircraft fueling adapter.

Additional problems arise due to the operating environment in which the typical fueling nozzle is utilized. The environment involves handling long relatively heavy fueling hoses under a variety of situational urgencies as well as all weather conditions. As a result, such aircraft fueling nozzles are often subjected to excessive mechanical force as they are coupled to the aircraft adapter. The aircraft adapter itself is configured primarily to provide secure mechanical engagement and is therefore a strong rigid member. The structures of the commonly used two and a half inch diameter adapter for pressure fuel servicing is described in various texts and in a military standard such as military standard MS24484. While the use of such standard adapters is essential to widespread fueling of aircraft, it also imposes substantial design restrictions upon fueling nozzle designs.

One area of difficulty and potential problems in such fueling nozzles of the type described above involves the tendency of the lock pins used to confirm adapter engagement to be damaged or bent during rough handling of the fueling nozzle. Once any one of the lock pins is damaged or bent, the nozzle usually becomes inoperative.

There remains therefore a continuing need in the art for evermore improved aircraft fueling nozzles. There remains in particular a continuing need in the art for improved aircraft fueling nozzles having substantially stronger lock pin configurations.

SUMMARY OF THE INVENTION

Accordingly, it is a general object of the present invention to provide an improved aircraft fueling nozzle. It is a more particular object of the present invention to provide an improved aircraft fueling nozzle which is less susceptible to damage during rough handling of the nozzle in the adapter engagement process.

In accordance with the present invention, there is provided for use in combination with an aircraft fueling adapter having a cylindrical extension defining an extension surface defining a plurality of indexing notches and a plurality of radially extending lock tabs, an aircraft refueling nozzle comprising: a nozzle body defining an outer surface, an interior throat passage and a surface, the surface defining a first plurality of bores and a second plurality of bores; a nozzle collar rotatably supported upon the outer surface of the nozzle body defining a plurality of helical ribs for engaging the lock tabs of the fueling adapter and a notched rib defining a plurality of notches therein; a plurality of index pins received within the first plurality of bores and extending beyond the surface; a plurality of lock pins slidably received within the second plurality of bores and extending beyond the surface; a plurality of lock pin springs received within each of the second plurality of bores for urging the lock pins outwardly from the second plurality of bores; and a lock pin ring secured against the surface of the nozzle body defining a first plurality of circular apertures through which the indexing pins pass and a second plurality of non-circular apertures through which the lock pins pass, the lock pins each defining a generally cylindrical portion received within the second plurality of bores, a non-cylindrical portion extending through the non-circular apertures of the lock pin ring, the non-circular portion having a larger portion extending into one of the notches and a reduced off-set portion extending beyond the notched rib.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 sets forth a planar view of the ring portion of the present invention aircraft fueling nozzle;

FIG. 4 sets forth a perspective view of a lock pin configured in accordance with the present invention; and FIGS. 5A and 5B sets forth partial section views showing the interaction of the lock pin and nozzle body of the present invention aircraft fueling nozzle.

DESCRIPTION OF THE PREFERRED EMBODIMENT

Figure 1:
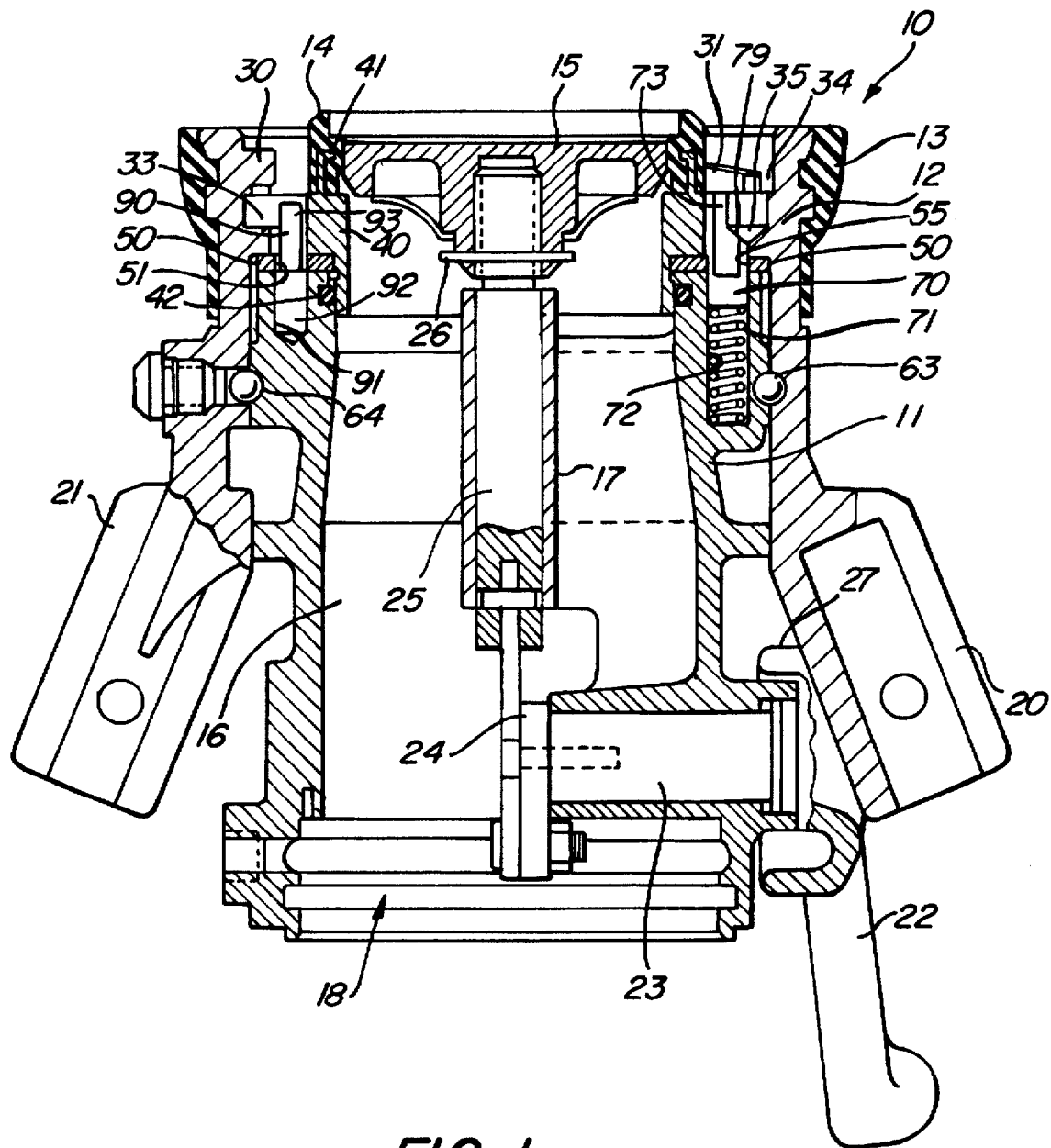
FIG. 1 sets forth a partial section view of an aircraft fueling nozzle constructed in accordance with the present invention.

FIG. 1 sets forth a broken section view of an aircraft fueling nozzle constructed in accordance with the present invention and generally referenced by numeral 10. Nozzle 10 includes an elongated generally cylindrical nozzle body 11 defining a throat passage 16 extending therethrough. Nozzle body 11 also supports a rotatable transversely extending shaft 23 which in turn supports a rotatable valve crank handle 22. The interior end of shaft 23 is coupled to a linkage arm pair 24 which in turn is secured to the lower end of a poppet shaft 25. The latter is vertically movable within a cylindrical guide 17 formed within throat 16 and preferably integral with nozzle body 11. Nozzle body 11 further supports a coupling 18 at the lower portion thereof which is configured to receive a fuel delivery coupling such as a fuel delivery hose end fitting or the like in a secure mechanical and liquid tight engagement.

Nozzle 10 further includes a seal retainer 40 having a generally cylindrical shape which is received within the upper portion of nozzle body 11 and extends partially downwardly into the interior of throat 16. Seal retainer 40 defines a plurality of upwardly extending tongues 41 which in turn receive and secure a resilient generally annular seal 14. The interior passage of seal 14 together with the interior passage of seal retainer 40 complete the fuel passage throat of nozzle 10. A valve poppet 15 configured to engage and form sealing contact with the interior surfaces of seal 14 is secured to the upper end of poppet shaft 25 by a conventional attachment pin 26. The position of valve poppet 15 with respect to seal 14 determines the valve open and closed positions for nozzle 10. This position is determined by the rotational position of valve crank 22 and shaft 23 coupled through linkage 24. In its preferred form, linkage 24 defines an "over-center" linkage arrangement in which the end travel portions which raise and lower poppet 15 are moved over center to resist external forces and maintain the valve position.

In accordance with an important aspect of the present invention, the upper surface of nozzle body 11 receives an annular substantially flat lock pin alignment ring (better seen in FIG. 3) which rests upon the upper edge of nozzle body 11 and which is captivated against nozzle body 11 by the position of seal retainer 40. Thus, ring 50 is maintained in the position shown by the upper surface of nozzle body 11 and the undersurface of seal retainer 40. An O-ring 42 is positioned between seal retainer 40 and the underlying interior surface of throat 16 to maintain a seal between retainer 40 and nozzle body 11.

Nozzle 10 further includes a nozzle collar 12 having a generally cylindrical shape which is larger in diameter than the exterior of nozzle body 11 and thus is receivable upon the outer surface of the nozzle body. Nozzle collar 12 further supports a pair of downwardly angled extending handle receptacles 20 and 21 which in accordance with conventional fabrication techniques receive the end portions of further extending handles (not shown) used by the fueling crews to manipulate fueling nozzle 10. Nozzle collar 12 is rotatably supported upon the underlying exterior surfaces of nozzle body 11 and is maintained in its position by a plurality of ball bearings such as ball bearings 63 and 64 within a pair of mating circular bearing races. The essential aspect of the support of nozzle collar 12 upon nozzle body 11 with respect to the present invention is the capability of nozzle collar 12 to be rotated with respect to nozzle body 11. Nozzle collar 12 further supports a resilient bumper 13 which encircles the upper portion of the outer surface of nozzle collar 12. A plurality of inwardly extending helical locking ribs 30, 31 and 32 extend inwardly from the interior surface of nozzle collar 12 as is better seen in FIG. 2. As is also better seen in FIG. 2, helical locking ribs 30, 31, and 32 are separated forming gaps 45, 46 and 47 therebetween. A notched rib 33 also extends inwardly from the interior surface of nozzle collar 12 and, as is also better seen in FIG. 2 defines a plurality of notches 34, 35 and 36.

Figure 2:
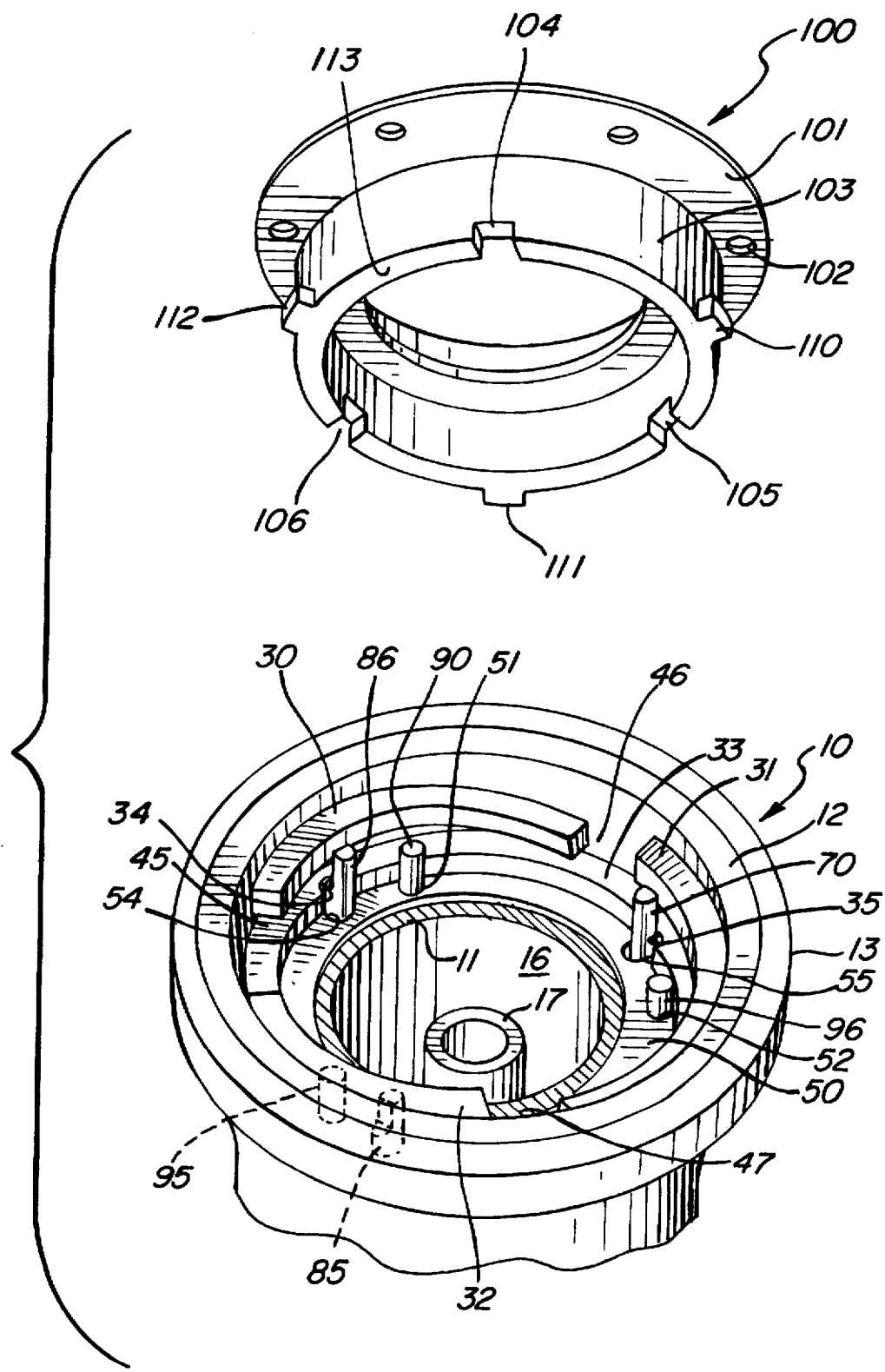
FIG. 2 sets forth a perspective assembly view of the present invention aircraft fueling nozzle.

Nozzle body 11 further defines a bore 91 extending downwardly from the upper surface of nozzle body 11. Bore 91 receives a lower cylindrical portion 92 of an indexing pin 90. Indexing pin 90 further defines an upwardly extending reduced diameter portion 93. As is seen in FIG. 3, lock pin alignment ring 50 defines an aperture 51 which facilitates the extension of reduced diameter portion 93 of indexing pin 90 upwardly in the space formed between notched rib 33 and the outer surface of seal retainer 40. As is seen in FIG. 2, a total of three indexing pins 90, 95 and 96 are supported within nozzle body 11 in a generally equally spaced arrangement. It will be understood that nozzle body 11 defines corresponding bores which receive the lower end portions of indexing pins 95 and 96 in the same manner as set forth in FIG. 1 with respect to the attachment of indexing pin 90. Thus, nozzle body 11 supports a trio of upwardly extending indexing pins. Nozzle body 11 further defines a trio of bores such as bore 72 extending downwardly from the upper surface of nozzle body 11. A trio of lock springs such as lock spring 71 are received within the bores formed in nozzle body 11 in the manner shown for lock spring 71 within bore 72. A corresponding trio of lock pins 70, 85, and 86 (seen in FIG. 2) are slidably received within respective bores formed within nozzle body 11 in the manner shown for lock pin 70 within bore 72. Thus, lock pin 70 is resiliently supported within bore 72 and urged upwardly to the raised position shown in FIG. 1 by lock pin spring 71. As is better seen in FIG. 4, lock pin 70 defines a pair of flat facets 74 and 75 on each end thereof which terminate in respective shoulder portions 78 and 77 (the latter also seen in FIG. 4). Lock pin 70 further includes an angled portion 79 extending upwardly to an upper end 73. With temporary reference to FIGS. 3 and 5A and 5B, it will be noted that aperture 55 formed within lock pin alignment ring 50 is elongated having generally parallel side edges 59 and 60. In accordance with the present invention, the upper portion of lock pin 70 defining facets 74 and 75 is able to pass through aperture 55 in lock pin alignment ring 50. However, the extension outwardly of shoulder portions 77 and 78 of lock pin 70 extend beyond edges 59 and 60 of lock pin 55 (seen in FIG. 5). As a result, despite the upward force of lock pin spring 71 against lock pin 70, the upward extension of lock pin 70 is limited to the position shown in FIG. 1. Of particular importance with respect to the present invention is the formation of a plurality of notches such as notch 35 within rib 33. Thus, in the position shown in which lock pin 70 is forced upwardly against lock pin alignment ring 50, the portion of lock pin 70 below angled surface 79 is received within notch 35. This position shown in FIG. 1 corresponds to the locked position of lock pin 70 shown in FIG. 5A. In accordance with an important aspect of the present invention described below in greater detail, lock pin 70 being resiliently supported in the upward position shown in FIG. 1 is able to be forced downwardly against the force of lock pin spring 71 within bore 72 to the depressed pin position shown in FIG. 5B. When so positioned, lock pin 70 no longer extends into notch 35. As will be described below in greater detail, the depression of lock pin 70 releases the engagement between nozzle body 11 and nozzle collar 12 allowing nozzle collar 12 to be rotated upon nozzle body 11. Suffice it to note here, however, that lock pin 70 is positionable in either the raised locking position shown in FIG. 1 and FIG. 5A and is depressible to a release position shown in FIG. 5B. In accordance with a further important aspect of the present invention, the structure of lock pin 70 having flat facets 74 and 75 in cooperation with straight parallel edges 59 and 60 of aperture 55 as seen in FIG. 3 combine to maintain the rotational position of lock pin 70 in the manner shown in FIG. 1. This cooperation prevents rotational movement of lock pin 70 within bore 72 thereby maintaining the proper alignment and position of end 73. This maintenance of rotational position provided by the shape of aperture 55 and the upper portion of lock pin 70 is essential to the proper operation of the present invention and forms an important aspect thereof.

It should be understood by those skilled in the art that lock pins 85 and 86 are identical in fabrication to lock pin 70. It should be further apparent to those skilled in the art that lock pins 85 and 86 are supported within nozzle body 11 in an identical manner as shown in FIG. 1 for lock pin 70 within bore 72.

The operation of the present invention nozzle is set forth below in greater detail. However, suffice it to note here with respect to FIG. 1 that nozzle 10 is mated to a standard fueling adapter such adapter 100 shown in FIG. 2 such the indexing pins such as indexing pin 90 supported within nozzle body 11 are received within corresponding alignment notches formed in the adapter. In addition, the insertion of adapter 100 described below in greater detail results in forcing lock pin 70 downwardly within bore 72 removing the lock pin extension into notch 35 of notched rib 33. It will be understood that a corresponding cooperation is provided between the remaining indexing pins of nozzle body 11 and alignment notches formed in adapter 100. It will be further apparent that a similar cooperation occurs between the undersurface of fueling adapter 100 and the remaining lock pins of nozzle body 11. As a result, the mating of nozzle 10 with the standard aircraft fueling adapter depresses the three lock pins into their respective bores within nozzle body 11 which in turn releases the engagement of the lock pins with notched rib 33. This in turn facilitates the rotation of nozzle collar 12 with respect to nozzle body 11. This rotation allows the helical locking ribs such as ribs 30 and 31 to engage lock tabs formed on adapter 100 (seen in FIG. 2) to complete sealing engagement between nozzle 10 and the aircraft fueling adapter. In addition, the rotation of nozzle collar 12 releases the mechanical interlock operative upon valve crank 22 which utilizes flat surface 27 thereof. The release of this mechanical allows rotation of valve crank 22 which in turn utilizes linkage 24 to drive poppet shaft 25 upwardly raising valve poppet 15 from seal 14 and allowing fuel flow through nozzle 10 into the aircraft fueling line. Once fueling is complete, the operator then rotates valve crank 22 to the position shown in Figure which in turn draws valve poppet 15 against seal 14 completing the closure of the nozzle valve and precluding further fuel flow. With valve crank 22 returned to the closed position shown in FIG. 1, nozzle collar 12 is rotated with respect to nozzle body 11 to release the engagement of nozzle 10 to the aircraft fueling adapter. As the rotation of nozzle collar 12 returns the notches formed within notched rib 33 to alignment with the lock pins allowing the respective lock pin springs to again drive the lock pins upwardly into the aligned notches and again lock the position of nozzle collar 12 upon nozzle body 11. At this point, the refueling process is complete and the fueling nozzle is removed from the aircraft fuel line.

It is important to note that, in accordance with an important aspect of the present invention, the fabrication of lock pins 70, 85 and 86 in the manner shown provides a high strength pin which is substantially more resistant to damages such as bending or breaking than the thinner diameter prior art pins. In further accordance with an important aspect of the present invention, the offset configuration of the upper portions of the lock pins provide this strength increase while maintaining sufficient clearance to facilitate the free movement of the lock pins in response to fueling adapter insertion and removal within the limited space available in the nozzle collar. This in turn provides an extremely important aspect of the present invention which allows the present invention fueling nozzle to be utilized with a standard aircraft fueling adapter.

FIG. 2 sets forth a partially section assembly view of the present invention nozzle together with a conventional fueling adapter. Fuel adapter 100 is fabricated in accordance with conventional fabrication techniques such as those set forth in the above-mentioned military specification and includes a generally cylindrical extension 103 having an outwardly extending circular flange 100. The latter defines a plurality of apertures 102 for use in securing adapter 100 within the fueling receptacle of the host aircraft. Adapter 100 further defines a trio of indexing notches 104, 105 and 106 spaced equally about end surface 113 of cylindrical extension 103. In addition, cylindrical extension 103 defines an outwardly extending trio of lock tabs 110, 111 and 112 also equally spaced upon cylindrical extension 103.

Nozzle 10, as described above, includes a nozzle body 11 upon which a generally cylindrical nozzle collar 12 is rotatably supported. As is also described above, nozzle body 11 defines a center guide 17 and a throat 16 extending therethrough. For purposes of more clearly illustrating the configuration of nozzle 10 with particular attention to the lock pin arrangement therein, a partial broken sectioning of nozzle 10 is provided in FIG. 2 which in essence removes seal retainer 40, seal 14, poppet valve 15, and poppet shaft 25 (all seen in FIG. 1). Thus, nozzle collar 12 is seen to define a trio of inwardly extending helical locking ribs 30, 31 and 32 having gaps 45, 46, 47 therebetween. Nozzle collar 12 further defines an inwardly extending notched ridge 33 defining a plurality of notches 34, 35 and 36 (36 not shown due to the perspective view of FIG. 2). A resilient bumper 13 encircles the upper portion of nozzle collar 12. As is also described above, nozzle collar 12 supports an annular flat lock pin alignment ring 50 having a trio of elongated apertures 54, 55 and 56 (better seen in FIG. 3). Ring 50 further defines a second trio of apertures 51, 52 and 53 also better seen in FIG. 3. A trio of lock pins 70, 85 and 86 are received within apertures 55, 56 and 57 respectively. Similarly, a trio of index pins 90, 95 and 96 are received within apertures 51, 52 and 53 of ring 50. It should be recalled that lock pins 70, 85 and 86 are resiliently supported within nozzle body 11 and are thus spring-biased upwardly through their respective elongated apertures to be received within notches 34 through 36 when nozzle collar 12 is rotated to the position shown in FIG. 2 producing alignment between each set of lock pins and their respective notches. When so positioned, the engagement of lock pins 70, 85 and 86 within their respective notches in rib 33 prevents rotational movement of nozzle collar 12 with respect to nozzle body 11. This locking action maintains the rotational position of nozzle collar 12 upon nozzle body 11 such that the opening of the fuel flow valve seen in FIG. 1 is prevented.

Nozzle 10 is coupled to the host aircraft using the engagement of nozzle 10 upon fueling adapter 100. While not seen in FIG. 2, it will be understood that in the typical aircraft fueling apparatus, adapter 100 is coupled to an appropriate fuel inlet line by which fuel is introduced into the host aircraft. Thus, the engagement of nozzle 10 is carried forward by aligning nozzle 10 with adapter 100 such that surface 113 and cylindrical extension 103 is generally aligned with the center recess of nozzle collar 12. Further, nozzle 10 is rotated to align lock tabs 110, 111 and 112 with gaps 45, 46 and 47. This alignment also produces alignment between indexing notches 104, 105 and 106 and indexing pins 90, 95 and 96. Of particular importance in connection with the present invention, the above-described alignment of nozzle 10 with adapter 100 facilitates the reception of cylindrical extension 103 of adapter 100 within nozzle collar 12. As nozzle 10 is forced against fueling adapter 100, surface 113 is brought to bear upon lock pins 70, 85 and 86 overcoming the spring forces which maintain the lock pins in the extended position shown in FIG. 2 and driving the lock pins downwardly into their respective bores within nozzle body 11 as shown in FIGS. 5A and 5B. The unique fabrication of lock pins 70, 85 and 86 results in disengagement of the lock pins with their respective notches in ring 33. This disengagement is shown in greater detail in FIGS. 5A and 5B. However, suffice it to note here that as lock pins 70, 85 and 86 are forced downwardly through their respective apertures in ring 50, the portions of the lock pins which engage the notches within rib 33 are removed from the notches. Most importantly, this disengagement facilitates or frees nozzle collar 12 from nozzle body 11 allowing the rotation of the nozzle collar to complete the above-described engagement with fueling adapter 100. In accordance with a further important advantage of the present invention, the lock pins maintain substantial strength despite the constricted environment in which they are movable and, as a result, are substantially more resistant to damage such as bending or breaking which has been a problem in prior art devices which rely upon locking pins.

FIG. 3 sets forth a top planar view of lock pin alignment ring 50. Ring 50 is generally flat and annular defining a center aperture 65 and a circular outer edge. A plurality of circular apertures 51, 52 and 53 are radially spaced upon lock ring 50 and are aligned to receive indexing pins 90, 95 and 96 in the above-described assembly. Ring 50 further defines a trio of elongated lock pin apertures 54, 55 and 56 also equally spaced upon lock pin alignment ring 50. Each of apertures 54 through 56 is identically fabricated to form an elongated aperture having parallel sides which cooperate with the flat facets of each respective lock pin to maintain the rotational alignment of the lock pins in the manner shown in FIG. 2. More specifically, aperture 54 includes parallel straight side edges 57 and 58 to receive pin 86 while aperture 55 defines straight parallel side edges 59 and 60 to receive pin 70 and aperture 56 defines straight parallel side edges 61 and 62 to receive pin 85. It will be recalled that a functional aspect of the side edges of apertures 54 through 56 is to interact with the respective shoulder portions of each of the lock pins received therein to limit the vertical travel of the lock pins. It will be further recalled that the elongated character of apertures 54 through 55 maintains the rotational position of the lock pins.

FIG. 4 sets forth a perspective view of lock pin 70. It should be noted that lock pins 70, 85 and 86 are identically fabricated and thus the descriptions of lock pin 70 set forth herein should be understood to apply equally well to lock pins 85 and 86. Accordingly, lock pin 70 includes a cylindrical portion 76 having a pair of flat side facets 74 and 75 and defining shoulder portions 77 and 78 (the latter seen in FIG. 1). Lock pin 70 further defines an upper end 73 which is reduced in size relative to cylindrical portion 76 due to an angled surface 79 formed on the frontal portion of lock pin 70. The fabrication of lock pin 70 provides a cylindrical portion which readily moves within a circular bore within the nozzle body while facilitating substantial strength within upper end 73 due to the offset configuration of the lock pin. The shape and configuration of end portion 73 of lock pin 70 provides a maximum of lock pin upper end strength while continuing to operate within the limited space available within nozzle collar 12.

FIG. 5A sets forth a perspective scrap section view showing nozzle collar 12 and ring 50 positioned with relative positions corresponding to the locked position of FIG. 2. Thus, nozzle collar 12 having notch 35 formed within rib 33 is positioned with respect to ring 50 such that lock pin 70 is aligned with notch 35. It will be recalled that a corresponding alignment occurs between the remaining lock pins and their respective cooperating notches formed within rib 33. As described above, ring 50 defines an elongated aperture 55 having straight side edges 59 and 60 which receive lock pin 70. Lock pin 70 defines an upper end 73 which is sufficiently reduced in size to clear rib 31 of collar 12. The offset configuration of lock pin 70 is accommodated by the elongation of aperture 55 and the cooperation of facets 74 and 75 (the former seen in FIG. 1) of lock pin 70. In the position shown in FIG. 5A, the underlying lock spring (seen in FIG. 1) urges lock pin 70 to the raised position shown moving the lock pin into engagement with notch 35. As a result of this engagement, rotational motion between nozzle collar 12 and nozzle body 11 is prevented.

FIG. 5B sets forth the configuration of lock pin 70 following the insertion of the cylindrical extension of fueling adapter 100 in the manner set forth in FIG. 2 and described above. As set forth therein, the upper end of lock pin 70 is contacted by the bottom surface of adapter 100 forcing lock pin 70 downwardly through aperture 55 and overcoming the retaining force of the lock pin spring. Once lock pin 70 has been forced downwardly through aperture 55, the portion of lock pin 70 previously engaging notch 35 is moved downwardly and thus no longer extends into notch 35. As a result, lock pin 70 no longer engages notch 35 of rib 33. This in turn frees nozzle collar 12 for rotational movement with respect to nozzle body 11. The rotational alignment of lock pin 70 is maintained due to the cooperation of edge portions 59 and 60 of aperture 55 and flat side facets 74 and 75 of lock pin 70. Because lock pin 70 is reduced in dimension solely on one side rather than from all sides as provided in conventional lock pins, lock pin 70 maintains substantially greater strength and rigidity than prior art lock pins. Accordingly, lock pin 70 is operative within the same restricted environment necessitated by the standard fueling adapter as prior art lock pins but is substantially stronger and more resistant to bending and breaking.

What has been shown is a significant improvement in aircraft fueling nozzles utilizing a nonsymmetrical locking pin arrangement in which the lock pin is supported in a spring-loaded arrangement while precluded from rotational movement. This allows the offset configuration of the lock pin to provide substantially improved strength while avoiding the need for increasing the overall diameter of the lock pin.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in combination with an aircraft fueling adapter having a cylindrical extension defining an extension surface defining a plurality of indexing notches and a plurality of radially extending lock tabs, an aircraft refueling nozzle comprising:

a nozzle body defining an outer surface, an interior throat passage and a surface, said surface defining a first plurality of bores and a second plurality of bores;

a nozzle collar rotatably supported upon said outer surface of said nozzle body defining a plurality of helical ribs for engaging said lock tabs of said fueling adapter and a notched rib defining a plurality of notches therein;

a plurality of index pins received within said first plurality of bores and extending beyond said surface;

a plurality of lock pins slidably received within said second plurality of bores and extending beyond said surface;

a plurality of lock pin springs received within each of said second plurality of bores for urging said lock pins outwardly from said second plurality of bores; and a lock pin ring secured against said surface of said nozzle body defining a first plurality of circular apertures through which said indexing pins pass and a second plurality of non-circular apertures through which said lock pins pass, said lock pins each defining a generally cylindrical portion received within said second plurality of bores, a non-cylindrical portion extending through said non-circular apertures of said lock pin ring, said non-circular portion having a larger portion extending into one of said notches and a reduced off-set portion extending beyond said notched rib.

2. An aircraft refueling nozzle as set forth in claim 1 wherein said non-cylindrical portion of said lock pins each define a pair of opposed flat generally parallel side facets.

3. An aircraft refueling nozzle as set forth in claim 2 wherein said reduced off-set portion of said lock pins each define an angled portion extending from said larger portion and a flat portion extending therefrom substantially orthogonal to said side facets.

4. An aircraft refueling nozzle as set forth in claim 3 wherein each of said lock pins defines a pair of opposed shoulder portions extending between said cylindrical portion and said side facets.

5. For use in combination with an aircraft fueling adapter having a cylindrical extension defining an extension surface defining a plurality of indexing notches and a plurality of radially extending lock tabs, an aircraft refueling nozzle comprising:

a nozzle body defining an outer surface, an interior throat passage and a surface, said surface defining a first plurality of bores and a second plurality of bores;

a nozzle collar rotatably supported upon said outer surface of said nozzle body defining a plurality of helical ribs for engaging said lock tabs of said fueling adapter and a notched rib defining a plurality of notches therein;

a plurality of index pins received within said first plurality of bores and extending beyond said surface;

a plurality of lock pins slidably received within said second plurality of bores and extending beyond said surface;

a plurality of lock pin springs received within each of said second plurality of bores for urging said lock pins outwardly from said second plurality of bores; and a lock pin ring secured against said surface of said nozzle body defining a first plurality of circular apertures through which said indexing pins pass and a second plurality of non-circular apertures through which said lock pins pass each of said non-circular apertures having parallel straight edges, said lock pins each defining a cylindrical portion and a faceted portion, said faceted portion having opposed parallel planar facets spaced to pass through said second pluralities of apertures so as to be prevented from rotational movement, said faceted portion terminating in an off-set reduced portion.

6. An aircraft fueling nozzle as set forth in claim 5 wherein said first and second pluralities are each equal to three.

7. An aircraft fueling nozzle as set forth in claim 6 wherein each of said lock pins defines an angled surface extending between said faceted portion and said off-set reduced portion.

8. An aircraft fueling nozzle as set forth in claim 7 wherein said lock pins each include a pair of shoulders formed at the intersection of said cylindrical portion and said faceted portions, said shoulder portion extending beyond said straight edges of said second plurality of apertures to prevent said cylindrical portion from passing through said second plurality of apertures.

* * * * *